United States Patent [19]
Hart et al.

[11] 4,378,950
[45] Apr. 5, 1983

[54] INSHOT VALVE ARRANGEMENT FOR RAILWAY BRAKE CONTROL APPARATUS EMPLOYING COMBINED AIR RESERVOIR/BRAKE CYLINDER DEVICE

[75] Inventors: James E. Hart, Trafford, Pa.; Robert J. Zahradnik, Farmington, N. Mex.

[73] Assignee: American Standard Inc., Wilmerding, Pa.

[21] Appl. No.: 217,969

[22] Filed: Dec. 19, 1980

[51] Int. Cl.³ .............................. B60T 15/22
[52] U.S. Cl. ........................ 303/36; 303/70
[58] Field of Search .................. 303/36–38, 303/56, 66, 70, 80

[56] References Cited

U.S. PATENT DOCUMENTS

| | | | |
|---|---|---|---|
| 2,054,855 | 9/1936 | Framer | 303/70 X |
| 2,812,985 | 11/1957 | Thomas et al. | 303/35 |
| 3,370,893 | 2/1968 | McClure et al. | 303/36 |
| 4,225,193 | 9/1980 | Hart | 303/35 |

Primary Examiner—Duane A. Reger
Attorney, Agent, or Firm—G. J. Falce

[57] ABSTRACT

An inshot valve device for use with railway brake apparatus of the type employing a brake cylinder in which the chambers formed on opposite sides of the brake cylinder piston serve as storage reservoirs. Braking force is obtained by the venting of air from the storage reservoir chamber on one side of the brake cylinder piston following movement of the piston to brake application position, so that the storage reservoir chamber from which air is vented is reduced to a minimum to conserve air. During an emergency brake application, the air from this storage reservoir chamber is vented via the inshot valve device, which controls the emergency buildup of brake forces in accordance with a predetermined brake force profile. The inshot valve device controls the emergency brake force buildup to follow this predetermined profile irrespective of different brake pipe charges or different service brake applications that may exist at the time of the emergency.

12 Claims, 4 Drawing Figures

INSHOT VALVE ARRANGEMENT FOR RAILWAY BRAKE CONTROL APPARATUS EMPLOYING COMBINED AIR RESERVOIR/BRAKE CYLINDER DEVICE

BACKGROUND OF THE INVENTION

The present invention is concerned with brake apparatus for railway vehicles and particularly to such apparatus, as disclosed in copending Patent Application Ser. No. 195,149 assigned to the assignee of the present invention.

In the foregoing copending Patent Application, there is disclosed a dual-piston brake cylinder device that is arranged to provide for storage of sufficient air as necessary to develop the desired brake forces, without the need for conventional storage reservoirs. The dual pistons are tandem-connected, one being larger than the other and cooperating with the brake cylinder body to form air storage chambers on its opposite sides.

During brake release, air is supplied to these storage chambers by a control valve device that is operative in response to variations in the train brake pipe pressure. When a service brake application is initiated, the control valve device connects air from the brake pipe and also from one side of the larger piston to the opposite side of the smaller piston. A poppet valve device is provided to effect pressure equalization between the opposite chambers of the larger piston to permit movement of the dual pistons in a brake application direction under the influence of the pressure acting on the smaller piston. Once the tandem-connected pistons are in application position, the control valve releases pressure from the one side of the larger piston to establish a pressure differential thereacross and accordingly produce braking force.

During an emergency brake application, the venting of brake cylinder chamber 14 is established by an emergency sensitive valve device and controlled by an inshot valve adapted to control the emergency buildup of brake forces through a train in accordance with a predetermined brake force profile, whereby initially the brake forces produce rapid run-in of the train slack, thereafter the brake forces are held constant for a predetermined time period to assure sufficient "bunching" of the train slack, and thence restoring the rapid buildup of brake forces to preserve stopping distance.

SUMMARY OF THE INVENTION

The object of the present invention therefore is to provide an inshot valve device that is operable during emergency brake applications to control the exhaust of pressure from the application chamber of the brake cylinder device, such as to produce brake forces in accordance with the abovementioned brake force profile.

A further object of the invention is to provide an inshot valve, in accordance with the foregoing objective, capable of maintaining the "holding" phase of the braking profile for a predetermined duration irrespective of the level of brake pipe charge or the degree of brake pressure effective at the time of an emergency brake application.

These objects are achieved in the present invention by providing brake apparatus for a railway vehicle including a brake cylinder device of the type having a pair of interconnected pistons to which the vehicle brake rigging is connected, a larger one of the pistons having formed on opposite sides thereof first and second chambers in which compressed air is stored for use in controlling the vehicle brakes, and a control valve device that is operative in response to a reduction of brake pipe pressure to effect a quick service reduction of brake pipe pressure by connection of the brake pipe pressure to a third chamber formed on the one side of the smaller piston concurrent with connection thereto of the pressure in the first chamber formed on the side of the larger piston opposite the one side of the smaller piston. Until sufficient force is developed at the smaller piston to move the pistons and brake rigging to brake application position, the air stored in the second chamber is equalized with the air in the first chamber to prevent a pressure differential from developing across the larger piston. At a predetermined pressure in the third chamber designed to actuate the pistons and brake rigging to brake application position, the control valve exhausts the pressure in the first chamber to establish a pressure differential across the larger piston and thereby develop brake forces consistent with the brake pipe pressure reduction. A combined quick service and emergency valve provides continuous quick service activity during service brake applications while stabilizing the emergency piston, which operates only during emergency to effect a reduction of the pressure in the first chamber to a level below that to which the pressure is capable of being reduced during service, to obtain higher brake forces during emergency. The emergency piston also pilots a vent valve device to propagate the emergency reduction of brake pipe pressure through each car of the train. In addition, the combined quick service and emergency valve actuates a high pressure valve during emergency to trap the pressure of a timing volume in a first chamber under the control piston of the inshot valve, the timing volume having been previously pressurized from the brake cylinder application chamber, while concurrently the exhausting brake cylinder application chamber pressure effective in a chamber above the inshot valve control piston is reduced. This establishes a pressure differential across the control piston to overcome a bias spring and force the piston to a cut-off position in which a valve member operated by the control piston is closed to momentarily terminate further exhaust of the brake cylinder application chamber pressure. In this cut-off position of the inshot valve control piston, the piston is disengaged from a valve seat to allow the trapped pressure to act across a further area of the control piston, and to initiate a timed blowdown of the timing volume pressure via a timing choke. The resultant differential pressure area of the control piston assures a constant delay period before the control piston is reset to re-establish the exhaust of the brake application chamber pressure.

BRIEF DESCRIPTION OF THE DRAWINGS

These and other objectives and advantages of the present invention will become apparent from the following detailed description, when taken with the accompanying drawings in which.

DESCRIPTION AND OPERATION

Figure 4:
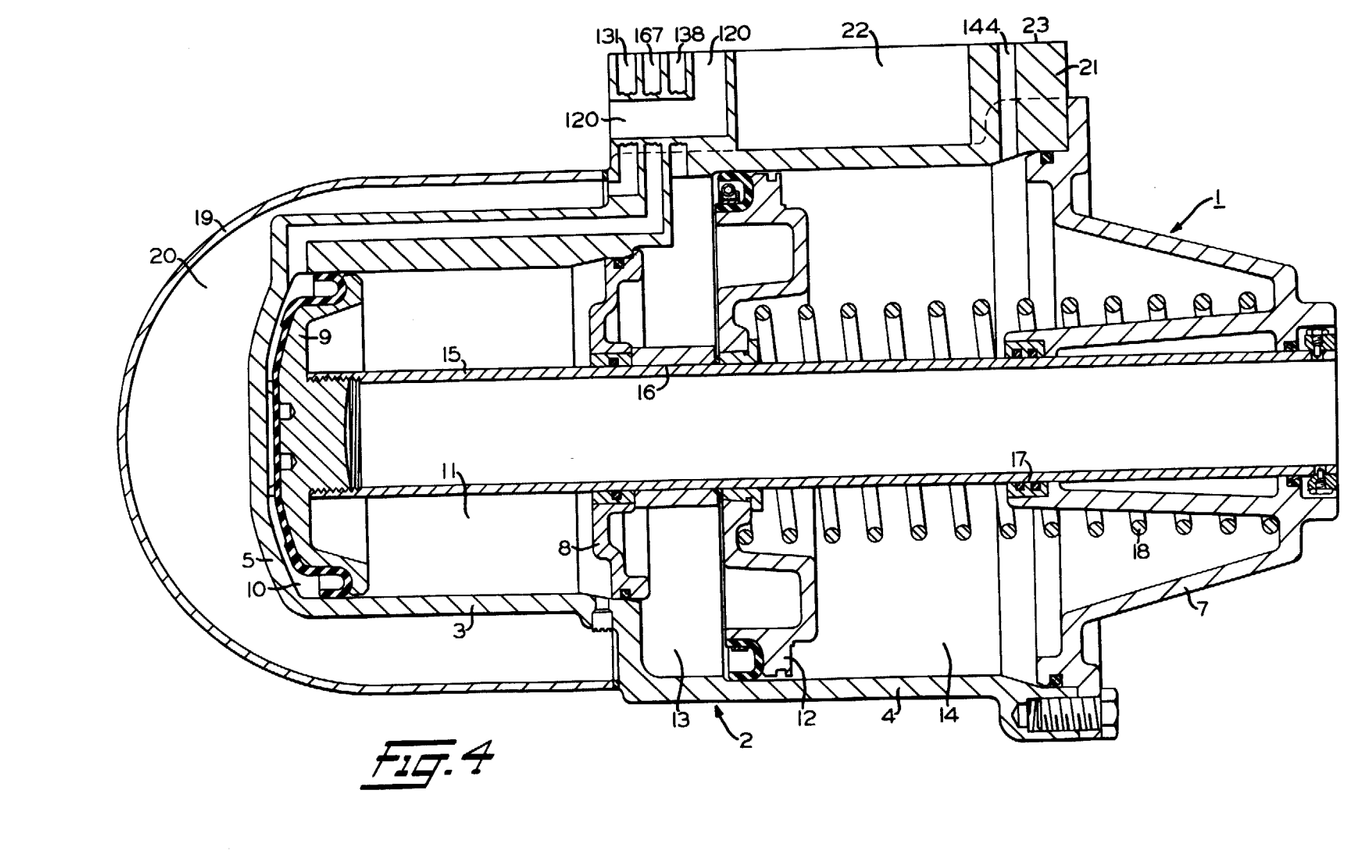
FIG. 4 is a diagrammatic view of the brake cylinder device of the present invention, which may be connected to the portion of the control valve device shown in FIG. 2.

As shown in FIG. 4 of the drawings, a combined brake cylinder and air reservoir device 1 comprises a main casting 2 having different sized cylindrical portions 3 and 4. The smaller cylindrical portion 3 is closed by an end wall 5 of casting 2, while the larger cylindrical portion 4 is closed by a separate closure member 7. A central member 8 separates cylindrical portions 3 and 4.

Cylindrical portion 3 contains a positioning piston 9 that cooperates with end wall 5 to form a chamber 10 at one end and with central member 8 to form an atmospheric chamber 11 at its opposite end. Cylindrical portion 4 contains a power piston 12 that cooperates with central member 8 to form a chamber 13 at one end and with closure member 7 to form a chamber 14 at its opposite end.

Positioning piston 9 and power piston 12 are connected to a hollow piston rod 15 that sealingly extends through an opening 16 in central member 8 and through another opening 17 in closure member 7. Standard type brake rigging (not shown) may be actuated by a push rod carried within and extending from hollow piston rod 15 in a conventional manner to transmit brake forces generated at pistons 9 and 12. Disposed about hollow piston rod 15 in chamber 14 is a piston return spring 18.

An enclosure member 19 is suitably mounted at a flange thereof to main casting 2, so as to form an emergency reservoir 20 between the enclosure member 19 and the smaller cylindrical portion 3 of main casting 2. Mounting boss 21 is cast with a quick action chamber 22 and a plurality of ports to which the various chambers of the combined brake cylinder and air reservoir device 1 are connected, and to which a branch line of the train brake pipe may be connected.

Figure 1:
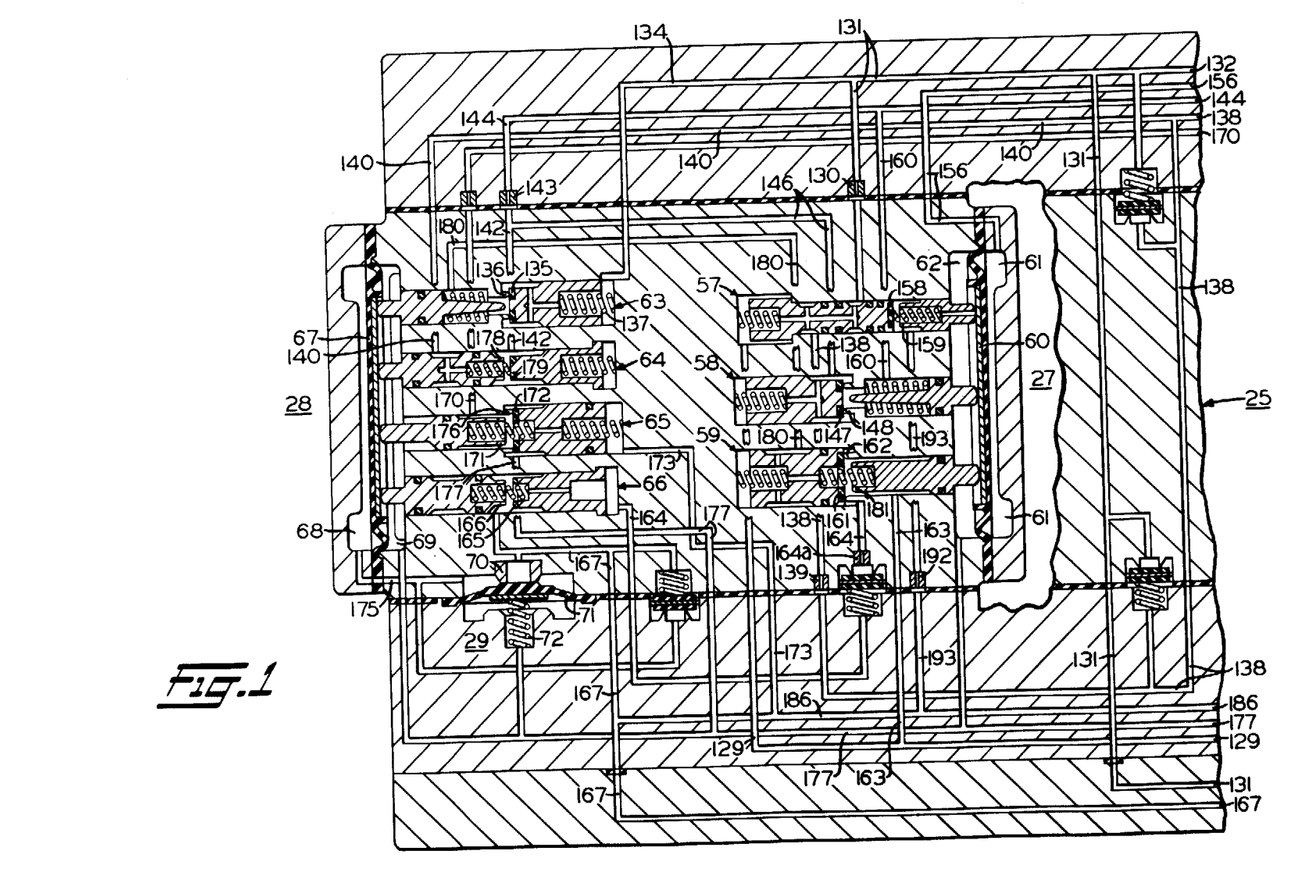
FIGS. 1, 2, and 3 are partial diagrammatic views which, when placed together end-to-end, constitute the control valve device including the inshot valve of the present invention.
Figure 2:
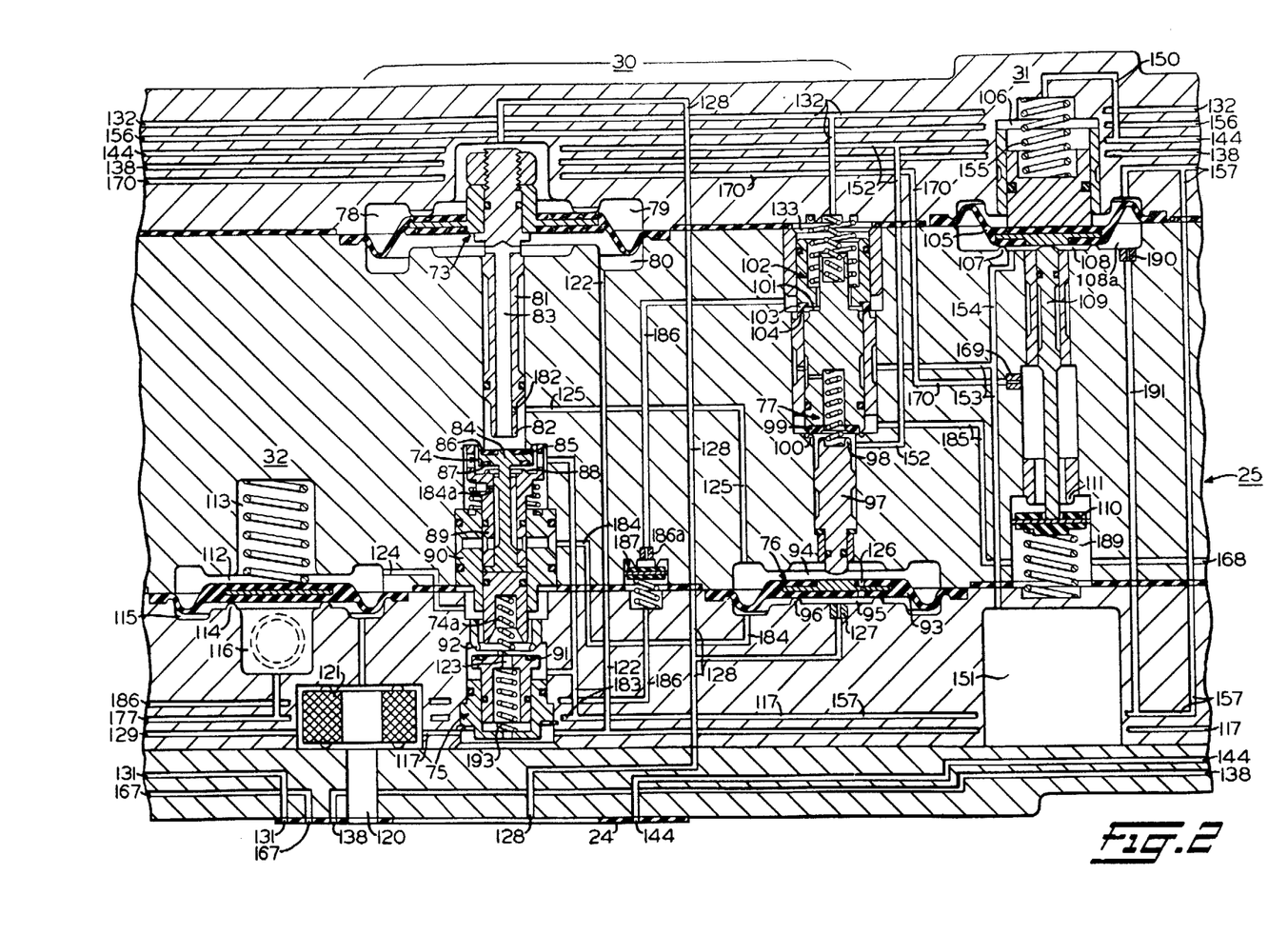
Figure 3:
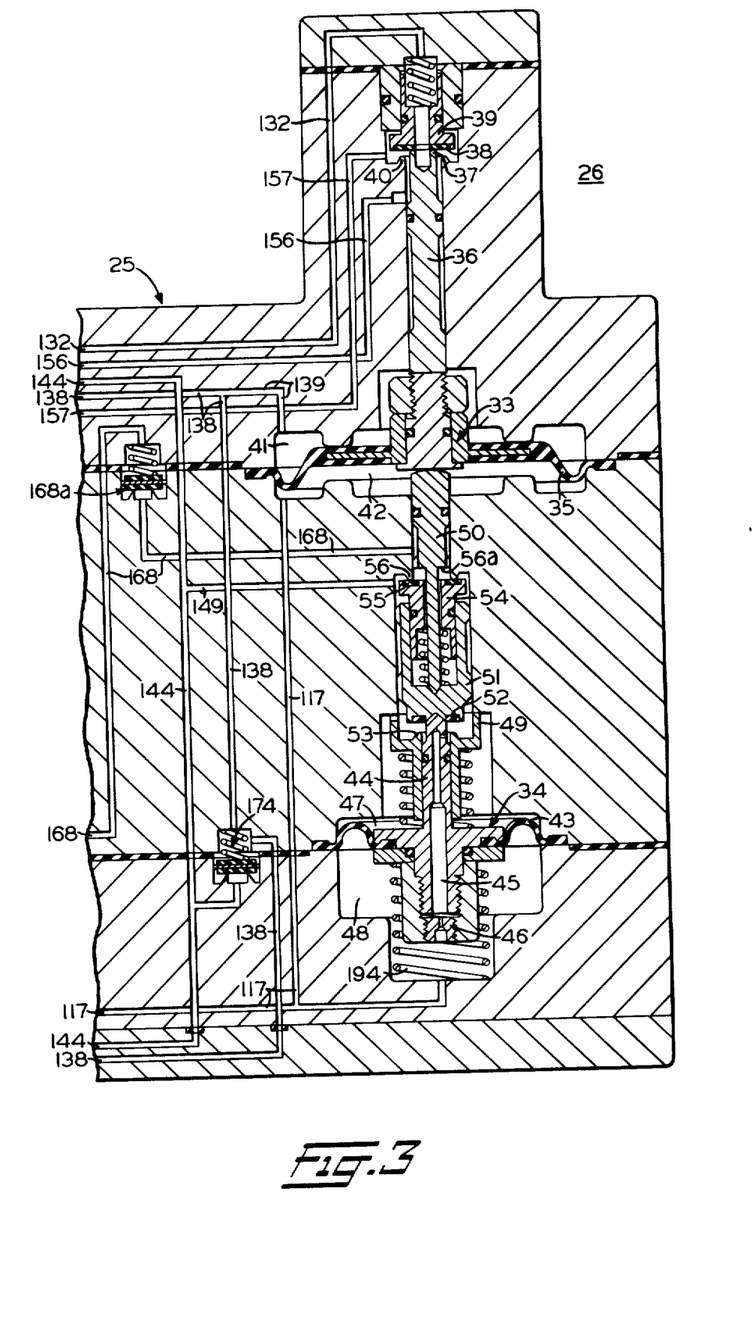

A mounting face 23 of mounting boss 21, FIG. 4, is attached to a corresponding face 24, FIG. 3, of a brake control valve device 25, which comprises a service valve 26, an application and release valve 27, a transfer valve 28, a transfer pilot valve 29, a combined quick service and emergency valve 30, an inshot valve 31, and a vent valve 32.

Referring to FIG. 3, a service valve 26 comprises a pair of different sized piston abutments 33, 34. One of these piston abutments 33 includes a diaphragm piston 35, to which is connected a piston stem 36 having an annular valve seat 37 formed on its end. An annular seat ring 38 carried on an appication/release pilot valve member 39 is arranged to cooperate with valve seat 37, and with an annular valve seat member 40 carried on the main body in surrounding relation with seat 37. A chamber 41 is formed on one side of diaphragm piston 35 and a chamber 42 is formed on the opposite side.

The other piston abutment 34 includes a diaphragm piston 43 having a stem 44 projecting in the direction of piston abutment 33. Stem 44 is provided with a central passage 45 having a stability choke 46 therein, via which fluid pressure in chambers 47 and 48 on opposite sides of diaphragm piston 43 is communicated. An annular valve seat member 49 is slidably carried about stem 44, which stem is connected to another stem 50 through a release stability valve member 51 having an annular seal ring 52 spaced adjacent an annular seat 53 of valve seat member 49. A bore in release stability valve member 51 slidably carries a graduated application valve member 54 having an annular seal ring 55 adjacent an annular valve seat 56 formed on the main body. A shoulder 56a is formed on stem 50 in spaced-apart relation to graduated application valve member 54 a distance greater than the spaced distance between seal ring 52 of release stability valve member 51 and valve seat 53, which latter distance is, in turn, greater than the distance between seal ring 38 and valve seat 40 of pilot valve member 39 in release position of service valve 26, as shown, to obtain sequential operation of the respective pilot valve, release valve, and application valve.

Application and release valve 27 comprises a charging valve 57, a release pressure control poppet valve 58, a quick service poppet valve 59, and a diaphragm piston actuator 60, with which the valves 57, 58, and 59 are engaged, by means of a spring bias acting on each poppet valve. Piston actuator 60 forms on its opposite sides a pilot chamber 61 and a vent chamber 62.

Transfer valve 28 comprises an accelerated release poppet valve 63, a charging poppet valve 64, a transfer poppet valve 65, a quick service limiting poppet valve 66, and a diaphragm piston actuator 67, with which the poppet valves 63, 64, 65, and 66 are engaged by a spring bias acting on each poppet valve. Formed on the opposite sides of piston actuator 67 is a pilot chamber 68 and a vent chamber 69.

Transfer pilot valve 29 comprises an annular valve seat 70 and a diaphragm piston valve 71 that is biased by a spring 72, so as to normally engage seat 70.

Combined quick service and emergency valve 30 comprises an emergency piston 73, an accelerated application valve 74, a vent valve pilot valve 75, a quick action chamber breather valve 76, and a high pressure valve 77. A diaphragm 78 of emergency piston 73 forms on opposite sides thereof pressure chambers 79 and 80. A stem 81 of piston 73 is formed with an annular valve seat 82. Extending between valve seat 82 and pressure chamber 80 is a central passage 83 in stem 81.

Accelerated application valve 34 comprises a double-faced valve element 84, which has an annular seal ring 85 on the upper face that cooperates with valve seat 82 at the inner periphery of the seal ring and which is spring-biased to normally engage at its outer periphery an annular valve seat 86 that is concentric with valve seat 82. The lower face of valve element 84 is provided with an annular seal ring 87 that cooperates with an annular valve seat 88 formed on a spring-biased member 89.

The end of accelerated application valve 74 opposite the double-faced valve element 84 engages one end of a spring-loaded pusher pin 90, the other end of which is spaced-apart from vent valve pilot valve 75 a predetermined distance. The vent valve pilot valve 75 comprises an annular seal ring 91 that is normally spring-biased into engagement with an annular valve seat 92, and is only unseated therefrom when pusher pin 90 is deflected a distance exceeding the aforesaid predetermined distance, by engagement with double-faced valve element 84.

The quick action chamber breather valve 76 comprises a diaphragm piston valve 93 that forms pressure chambers 94 and 95 on its opposite sides and cooperates with an annular valve seat 96 in chamber 95. One end of a pusher pin 97 projects into chamber 94 for engagement with piston valve 93, while the other end is formed with an annular valve seat 98 that cooperates with an annular seal ring 99 of high pressure valve 97 at the inner periphery of the seal ring 99. An annular valve seat 100 formed on the casing section concentric with annular seat 98 cooperates with seal ring 99 at its outer periphery, and is normally engaged therewith by reason of high pressure valve 77 being spring-biased. At the end of high pressure valve 77 opposite seal ring 99 is formed a shoulder 101 that is adapted to engage an emergency valve member 102 having an annular seal ring 103 that cooperates with an annular valve seat 104.

Inshot valve 31 comprises a diaphragm piston valve 105 that forms a chamber 106 on its upper side and cooperates with an annular valve seat 107 on its lower side to form a pressure chamber 108 within the periphery of the valve seat. The pressure in chambers 106 and 108 acts on opposing pressure areas of piston 105, which are preferably equal. The area outside the periphery of annular valve seat 107 cooperates with piston 105 to provide a chamber 108a that is open to atmosphere via a choke 189. Chamber 108a defines a pressure area of piston 105, which when combined with the pressure area defined by chamber 108, is greater than the pressure area defined by chamber 109 to establish a differential pressure area of piston 105, for a purpose hereinafter explained. Engageable with piston valve 105, on its under side, is a stem 109 that controls the cooperative relationship of a check valve 110 with an annular valve seat 111 formed on the casing section.

Vent valve 32 comprises a diaphragm piston valve 112 that forms a pressure chamber 113 on its upper side and cooperates with an annular valve seat 114 on its lower side to form a pressure chamber 115 outside the periphery of the valve seat and an atmospheric chamber 116, within the periphery of valve seat 114, to which a conventional vent protector (not shown) may be attached.

INITIAL CHARGING

During initial charging, brake pipe pressure is connected from the brake pipe branch line of each car of a train to a port 120 and a brake pipe strainer 121 via which the brake pipe pressure passes to vent valve chamber 115, to chambers 42 and 48 of service valve 26 via passage 117, to chamber 80 of the emergency piston 73 via branch passage 122 of passage 117, and to vent valve chamber 113 via passage 117, a central passage 123 in the vent valve pilot valve 75, past the end of pusher pin 90 and a passage 124.

From chamber 80, brake pipe pressure is connected via central passage 83, port valve seat 82 to a passage 125 leading to chamber 94 of quick action chamber breather valve 76. A quick action chamber charging choke 126 connects pressure from chamber 94 to the quick action chamber 22 via a breather choke 127 located within the periphery of seat 96, and a passage 128. From passage 128, quick action chamber pressure is connected to chamber 79 of the emergency piston 73, which is stabilized in its upper-most position, as shown.

From brake pipe strainer 121, a passage 129 connects brake pipe pressure to charging valve 57, which in the position shown, connects brake pipe pressure to emergency reservoir 20 via a charging choke 130 and a passage 131. Emergency reservoir pressure also flows from passage 131 to a passage 132 leading to a chamber 133 of emergency valve 102 and to the inner area defined by engagement of seal ring 38 of application and release pilot valve 29 with seat 37, in the release position of the service valve 26, as shown. Emergency reservoir pressure also flows from passage 131 to a passage 134 leading to accelerated release poppet valve 63, where the pressure is bottled by closure of the poppet valve seal element 135 on its seat 136, under the influence of a spring 137.

From charging valve 57, brake pipe pressure also charges chamber 13 of combined brake cylinder and air reservoir device 1 via a passage 138 and a charging choke 139 in passage 138. This pressure in chamber 13 also flows from passage 138 to chamber 41 of the service valve piston abutment 33 via a passage 139, and to charging poppet valve 64 via a passage 140.

Charging poppet valve 64, in the position shown, connects pressure from passage 140 to chamber 14 of the combined brake cylinder and air reservoir device 1 via a passage 142, a charging choke 143, and a passage 144. From passage 142, pressure flows via a branch passage 146 leading to release pressure control poppet valve 58, where in the position shown, the pressure is blanked by closure of the poppet valve seat element 147 on its seat 148. The pressure connected to brake cylinder chamber 14 also flows from passage 144 to chamber 47 of the service valve piston abutment 34 via a branch passage 149, and to chamber 106 at the inshot valve piston 105 via a branch 150 of passage 144, and also to a timing volume 151 via a branch 152 of passage 144, open valve 98-99 of high pressure valve 77, and a passage 153. This timing volume pressure is also registered in chamber 108 under the inshot valve piston 105 by way of a branch 154 of passage 153. With the effective opposing areas of inshot valve piston 105 being essentially equal, a spring 155 is effective to maintain the inshot valve 31 in the position shown, with check valve 110 disengaged from valve seat 111.

SERVICE BRAKE APPLICATION

In order to effect a service brake application, the pressure in the train brake pipe is reduced at a service rate by an operator an amount corresponding to the desired degree of brake application, in accordance with conventional, well-known train brake control practice. This reduction of the train brake pipe pressure is transmitted to each car brake control valve device 25 via the car branch pipe, which is connected to port 120 at brake cylinder mounting boss 21. Accordingly, the brake pipe pressure reduction is registered at chambers 42 and 48 of the service valve device 26, thereby creating a pressure differential across piston abutments 33 and 34 sufficient to effect a downward deflection of the service valve stack. Initial downward movement first causes engagement of the application and release pilot valve seal ring 38 with seat 40 to cut off fluid pressure communication between a pilot control passage 156 and an exhaust passage 157, while concurrently disengaging valve seat 37 from seal ring 38, to establish fluid pressure communication between passage 132 and pilot control passage 156. Consequently, emergency reservoir pressure is supplied to pilot chamber 61 of application and release valve 27 to deflect diaphragm piston actuator 60 and accordingly actuate valves 57, 58 and 59.

In its actuated position, poppet valve 57 terminates charging of emergency reservoir 20 and brake cylinder chamber 13 via annular grooves on the poppet valve body, and further terminates venting of chamber 10 by closure of the poppet valve seal element 158 on its seat 159. Also, seal ring 147 of poppet valve 58 is disengaged from its seat 148, thereby connecting passages 146 and 160 to maintain fluid pressure equalization between brake cylinder chambers 13 and 14, during subsequent displacement of pistons 9 and 12.

Finally, seal ring 161 of poppet valve 59 is disengaged from its seat 162 to establish fluid pressure communication between a branch passage 163 of passage 129, a passage 164, and a control choke 164a leading to quick service limiting poppet valve 66 of transfer valve 28.

Since transfer valve 28 is at this time deactuated, seal ring 165 of poppet valve 68 is disengaged from its seat 166, so as to connect passage 164 to a passage 167 leading to brake cylinder chamber 10. Thus, a local quick service reduction of brake pipe pressure is obtained by connecting brake pipe pressure to brake cylinder chamber 10 during the initial phase of a service brake application, to accelerate the brake pipe reduction through the train. It will be seen that this quick service function is activated only when the control valve is in a release and charging mode at the time of the service application.

The aforementioned quick service activity assures continued deflection of service valve stack 26, whereby seal ring 52 of release stability valve member 51 is subsequently engaged with valve seat 53 to cut off pressure communication between chambers 47 and 48 via stability choke 46 and central passage 45, it being understood that during brake release, the stability choke serves to dissipate brake pipe pressure fluctuations to prevent unintentional brake operation.

Continued deflection of service valve stack 26 finally causes shoulder 56a of push rod 50 to engage graduated application valve member 54 and deflect the valve member so that valve seal ring 55 is disengaged from its seat 56. This establishes fluid pressure communication between passage 149 and a passage 168. Consequently, pressure in brake cylinder chamber 14 is connected to transfer poppet valve 65 via port and passage 144, passage 149, open valve 55-56, passage 168, open inshot valve check valve 110-111, an inshot choke 169, and a passage 170. Since transfer valve 28 is deactuated at this time, a valve seat 171 of poppet valve 65 is disengaged from its seal ring 172, to connect passage 170 to a passage 173, that leads to brake cylinder chamber 10 by way of passage 167. Accordingly, pressure in brake cylinder chamber 14 is connected to brake cylinder chamber 10 along with quick service brake pipe pressure, as previously discussed, to effect movement of pistons 9 and 12 in a rightward direction to brake application position. During movement of pistons 9 and 12 to brake application position, the pressure in chamber 14 is connected to chamber 13 via poppet valve 58, as previously explained, and also via a one-way check valve 174 between passages 138 and 144, thereby forcing much of the air initially in chamber 14 to flow into chamber 13 and allowing the pressures to equalize between chambers 13 and 14 as piston 12 is displaced.

In brake application position of brake cylinder pistons 9 and 12, that is when piston travel is no longer possible due to brake shoe/wheel engagement, fluid pressure in chamber 14 continues to be supplied to chamber 10 along with brake pipe pressure until a predetermined pressure is realized therein, such predetermined pressure corresponding to a certain chosen minimum brake force. During this time, pressure in chamber 13 flows to chamber 14 via poppet valve 58 to maintain pressure equalization between chambers 13 and 14.

When the mentioned predetermined pressure is reached in chamber 10, for example 25 psi., diaphragm piston valve 71 of transfer pilot valve 29, which is subject to the pressure in chamber 10, is disengaged from seat 70 against the resistance of bias spring 72 to connect chamber 10 pressure to pilot chamber 68 of transfer valve 65 via passage 167, the open transfer pilot valve 29, and a passage 175. Consequently, the transfer valve piston actuator 67 is operated to, in turn, concurrently actuate the respective poppet valves 63, 64, 65, and 66.

Accordingly, valve 165-166 of poppet valve 66 closes to terminate further flow of brake pipe pressure to brake cylinder chamber 10, thus terminating the initial quick service activity. Valve 171-172 of poppet valve 65 also closes to concurrently terminate further flow of fluid pressure from brake cylinder chamber 14 to chamber 10. Accordingly, a predetermined minimum service brake application force is assured. When seat 171 of poppet valve 65 engages seal ring 172, the seal ring is disengaged from another annular seat 176, past which fluid pressure in chamber 14 is connected to a passage 177 leading to atmosphere. Thus, actuation of poppet valve 65 shifts the flow of fluid pressure in chamber 14 from chamber 10 to atmosphere, when transfer valve 28 is actuated.

Also, a valve seat 178 of poppet valve 64 engages its seal ring 179 to interrupt fluid pressure communication between passages 140 and 142, and thereby terminate further flow of fluid pressure from chamber 13 into brake cylinder chamber 14 during such time as chamber 14 is being vented.

Still further, valve 135-136 of poppet valve 63 is opened to connect emergency reservoir pressure in passage 134 to a passage 180, where the pressure is blanked by engagement of a seat 181 of poppet valve 59 with seal ring 161 in the actuated condition of application and release valve 27, thereby conditioning poppet valve 59 to subsequently connect this emergency reservoir pressure to the brake pipe to obtain an accelerated release of the brakes, as hereinafter discussed.

As the pressure in brake cylinder chamber 14 is thus exhausted, in relative proportion to the pressure reduction in the brake pipe, a pressure differential develops across brake cylinder power piston 12, since the pressure in chamber 13 now remains constant. The resultant force produced by power piston 12 coacts with the initial predetermined minimum service braking force developed by positioning piston 9, to obtain the braking force desired, in accordance with the degree of brake pipe reduction in effect.

As the pressure in brake cylinder chamber 14 continues to exhaust, a pressure reduction is reflected in chamber 47 of service valve 26. When this pressure in chamber 14 is reduced below brake pipe pressure enough to create an upward acting pressure differential across piston abutment 34 sufficient to offset the existing downward acting pressure differential across piston abutment 33, a force balance is restored and the piston stack moves upward to a lap position, in which seal ring 55 is re-engaged with seat 56 to terminate any further exhaust of pressure from brake cylinder chamber 14. In that the differential pressure area of piston abutment 33 is greater that the differential pressure area of piston abutment 34, a certain ratio of chamber 14 pressure reduction to brake pipe pressure reduction is obtained, as for example 4:1. A service limiting, one-way check valve 168a is arranged in passage 168 leading to inshot valve 31 in order to limit the maximum reduction of pressure in chamber 14 that can be made by service valve 26.

During the aforementioned brake application, combined quick service and emergency valve 30 is operative to provide continuous quick service activity, as well as service stability against undesired emergency brake applications. As the brake pipe pressure is being reduced, a pressure reduction is reflected in chamber 80 of emergency piston 73. Since quick action chamber pressure in opposing chamber 79 remains relatively constant, due to charging choke 126 restricting the backflow of quick action chamber pressure to the brake pipe, a force differential is created across diaphragm 78 of emergency piston 73, by the resultant preponderance of quick action chamber pressure in chamber 79, to deflect the emergency piston downwardly until the seat 82 on piston stem 81 engages the accelerated application valve 74.

At very slow rates of brake pipe reduction, this force of deflection of piston 73 is insufficient to actuate accelerated application valve 74 against its spring 74a. Therefore, the brake pipe pressure in chamber 94 of breather valve 96 is exhausted via passage 125, an accelerated application choke 182, and central passage 83 in piston stem 81. Since the quick action chamber pressure in chamber 95 of breather valve 76 is able to follow this low rate of brake pipe pressure reduction via breather choke 126 and charging choke 127, insufficient pressure differential develops across the breather valve diaphragm 93 to effect disengagement thereof from seat 96. Accordingly, piston 73 is stabilized and quick action chamber breather valve 76 remains in the position shown, wherein no quick service venting of the brake pipe pressure occurs.

At higher service rates of brake pipe reduction, a higher pressure differential is developed across diaphragm 78, which deflects piston 73 downwardly with sufficient force to overcome spring 74a and thereby actuate accelerated application valve 74, whereby valve 85-86 is opened, and valve 82-85 is closed. Accordingly, brake pipe pressure in chamber 94 of breather valve 76 is isolated from brake pipe pressure in passage 83 and is rapidly exhausted via passage 125, open valve 85-86, and an exhaust passage 183, so as to be exhausted independently of brake pipe pressure in the train brake pipe 120, and at a relatively faster rate. Once the fluid pressure in chamber 94 and passage 125 has been reduced, the fluid brake pipe pressure is also exhausted to atmosphere at a controlled rate via passage 83 and accelerated application choke 182, in bypass of closed valve 82-85. Quick action chamber pressure in chamber 95 is unable to follow the reduction of pressure in chamber 94, so that a pressure differential is developed across the breather valve diaphragm 93 sufficient to effect disengagement thereof from seat 96. When this occurs, the entire underside of diaphragm 93 is exposed to quick action chamber pressure to obtain positive unseating of diaphragm 93 with snap action. Quick action chamber pressure effective in chamber 79 of the emergency piston 73 is thus exhausted via passage 128, breather choke 127, seat 96, a passage 184, open valve 87-88, and exhaust passage 183, thus reversing the pressure differential across emergency piston 73 to cause the emergency piston to return to its normal position, without being deflected sufficiently to trigger an emergency brake application, as hereinafter explained. In the normal position of the emergency piston, valve 85-86 is closed and valve 82-85 is opened, thus re-establishing fluid pressure communication between the brake pipe and chamber 94. As chamber 94 is thus recharged, breather valve diaphragm 93 is reset and a further local brake pipe pressure reduction takes place to supplement the reduction effective at the brake pipe and to thereby accelerate the overall service brake pipe reduction and therefore the service application throughout the train.

As long as this service reduction of brake pipe pressure continues, service piston 73 will continue to cycle in rapid succession without attaining sufficient deflection to actuate vent valve pilot valve 75. The cycling action, however, will effect continuous, local quick service reductions of brake pipe pressure.

EMERGENCY BRAKE APPLICATION

In the event an emergency rate of brake pipe reduction is made, the rate of reduction of quick action chamber pressure via breather choke 127 is insufficient to reverse the pressure differential producing downward deflection of emergency piston 73, which is accordingly deflected sufficiently to effect closure of valve 87-88 of accelerated application valve 74, to terminate venting of quick action chamber pressure via passage 184. Quick action chamber pressure is thus forced to follow brake pipe pressure via breather choke 127 and charging choke 126 in series. Since the flow capacity of charging choke 126 limits the rate at which quick action chamber pressure can follow brake pipe pressure, the higher emergency rate of brake pipe pressure reduction in effect cannot be balanced and a pressure differential is established across breather valve diaphragm 93 sufficient to deflect the diaphragm to its upper-most position, while concurrently, sufficient pressure differential is established across emergency piston diaphragm 78 to effect downward deflection of emergency piston 73 to its emergency position.

In the upper-most position of diaphragm piston valve 93, pusher pin 97 is operated to actuate high pressure valve 77, which in turn actuates emergency valve 102. Actuation of high pressure valve 77 disengages seal ring 99 thereof from its valve seat, to thereby exhaust pressure in brake cylinder chamber 14 via passage 144, 152, open valve 99-100, a passage 185, open valve 110-111 of inshot valve 31, choke 169, passage 170, and poppet valve 65. This occurs in parallel with the exhaust of chamber 14 via the service valve 26, etc. It will thus be seen that during emergency, the exhaust of pressure from brake cylinder chamber 14 takes place in bypass of service limiting check valve 168a, to provide a further emergency reduction of pressure in chamber 14, depleting it, in fact, to atmospheric pressure, as compared to the level of reduction made during a service brake application. Consequently, a greater pressure differential is produced across power piston 12 during emergency, and thus a higher braking force is achieved.

This higher braking force produced by power piston 12 during emergency is supplemented by a higher force produced by positioning piston 9, as well. Actuation of emergency valve 102 results in emergency reservoir pressure being connected to brake cylinder chamber 10 via passages 131, 132, chamber 133 of emergency valve 102, open valve 103-104, a passage 186, a choke 186a, a one-way check valve 187, and a passage 167. Emergency reservoir pressure thus supplements the normal service application pressure in chamber 10 until a predetermined pressure differential exists between emergency reservoir 20 and brake cylinder chamber 10. Consequently, positioning piston 9 exerts a predetermined higher brake force during emergency than during service braking.

In addition, the deflection of emergency piston 73 to its emergency position results in pusher pin 90 of accelerated application valve 74 engaging and sealing on seal ring 91 of pilot valve 75 and subsequently unseating seal ring 91 from its fixed seat 92. Pilot pressure in the relatively small volume of chamber 113 above vent valve diaphragm 112 is thus isolated from the brake pipe fluid pressure and rapidly exhausted to atmosphere via passage 124, open valve 91-92, and exhaust passage 183. The brake pipe pressure in chamber 115 surrounding valve seat 114 is thus effective to unseat diaphragm vent valve 112 and exhaust directly to atmosphere, via, for example, a conventional vent protector (not shown). Thus, a local high capacity venting of brake pipe pressure is accomplished in response to the emergency rate of brake pipe pressure reduction in effect, thereby providing for the propagation of the emergency application.

In accordance with the foregoing explanation relative to accomplishing an emergency brake application, it will be noted that the emergency reduction of brake cylinder chamber 14 takes place via inshot valve device 31. The purpose of this inshot valve is to control the emergency buildup of brake forces through a train in accordance with a predetermined profile, in order to optimize interaction between the cars of the train by reducing draft gear forces without sacrificing train stopping distance. The emergency brake forces are controlled by controlling the exhaust of pressure from brake cylinder chamber 14 via service valve 26 and emergency valve 30, so as to initially provide rapid run-in of slack between the car couplers, holding the brake forces relatively constant for a certain delay period to assure that the train slack is sufficiently "bunched", and then providing a further rapid buildup of brake forces to preserve stopping distance.

When an emergency brake application is initiated, by reason of an emergency rate of brake pipe pressure reduction, both the service valve 26 and the emergency valve 30 are operative, as heretofore explained to exhaust fluid pressure from brake cylinder chamber 14 via inshot valve 31, it being understood that equal pressure initially exists in chambers 106 and 108, such pressures acting on essentially equal effective pressure areas of piston 105. Accordingly, bias spring 155 in chamber 106 is effective to hold piston 105 in its downward-most position, in which stem 109 holds the inshot check valve 110-111 open, until such time as the force of spring 155 is overcome. During the first stage of emergency, maximum exhaust of pressure from brake cylinder chamber 14 is realized via open inshot check valve 110-111. In response to actuation of the high pressure valve 77 during emergency, valve 98-99 is closed to cut off fluid pressure communication between passages 152 and 153 and to thereby trap fluid pressure in chamber 108 and timing volume 151, at the pressure prevailing in chamber 14 when the emergency application occurs, while the pressure in chamber 106 is exhausting with the pressure in brake cylinder chamber 14. This creates an upward-acting pressure differential across piston 105 sufficient to overcome bias spring 155, when a predetermined reduction of pressure has occurred in brake cylinder chamber 14, as for example 30 psi. At this point, piston 105 is forced upwardly, allowing a spring 189 to close inshot check valve 110-111 and thereby temporarily terminate the exhaust of pressure from brake cylinder chamber 14. When piston 105 is forced upwardly, it is disengaged from its seat 107 to expose the entire underside or piston 105 to timing volume pressure and thereby obtain snap action of piston movement and positive, sudden closure of inshot check valve 110-111, while concurrently connecting pressure in timing volume 151 to atmosphere via timing choke 190, a passage 191, passage 195, and exhaust passage 183. This latter operation establishes a timing period which represents a second phase of the emergency operation, during which the inshot check valve remains closed to terminate further exhaust of pressure from brake cylinder chamber 14 and accordingly effect a holding of the brake forces essentially constant, although a gradual increase in braking force occurs during this phase due to the gradual buildup of fluid pressure in chamber 10 from emergency reservoir 20, as previously described. When the timing volume pressure is decreased sufficiently to allow spring 155 and the remaining fluid pressure force in chamber 106 to reset piston 105 on seat 107, stem 109 is concurrently effective to again open inshot check valve 110-111 and reestablish the exhaust of pressure from brake cylinder chamber 14, to thereby obtain a further increase of the brake force. It is to be understood, that service check valve 168a cuts off exhaust of pressure from chamber 14 at a predetermined full service value, but the emergency valve high pressure valve 79 remains effective to completely vent chamber 14 pressure.

From the foregoing, it will be seen that in its upper position, in which the entire underside of piston 105 is exposed to timing volume pressure, piston 105 is provided with a differential pressure area, the effect of which is to require a predetermined percentage of pressure drop in timing volume 151 in order to reduce the upward acting pressure differential across piston 105 sufficiently to allow spring 155 to reset piston 105 and accordingly cause valve 110/111 to re-open. Since the differential area of diaphragm piston 105 requires a certain percentage drop in the timing volume pressure to reset piston 105, it follows that for higher initial pressures, the actual pressure drop in the timing volume is greater than for lower initial timing volume pressures. The purpose of this variation in the actual pressure reduction required to reset piston 105 from different initial pressures is to assure that the aforementioned timing period, representing the second phase of emergency, is constant irrespective of different pressures effective in brake cylinder chamber 14 at the time of an emergency brake application. This variation of timing volume pressure reduction is necessary to counteract the characteristic non-linear pressure/time relationship that exists when exhausting pressure from a given volume, such as timing volume 151. For example, it takes a higher initial pressure a lesser time to reduce a given amount than it takes a lower initial pressure to reduce the same amount from a given volume. It will be apparent, therefore, that this non-linearity is counteracted by the effect of the differential area of piston 105, which causes the actual pressure reduction in timing volume 151 necessary to reset piston 105 from different pressures effective at the time of an emergency to vary. For example, if the pressure in brake cylinder chamber 14 and thus in timing volume 151 at the time of an emergency brake application is relatively low, it will require a relatively longer period of time to reduce the timing volume pressure a given amount than would be required to reduce relatively higher timing volume pressures by the same amount. Since the differential area of piston 105 requires the timing volume pressure under piston 105 to reduce by a predetermined percentage to allow spring 188 to reset piston 105, however, the amount of actual reduction of timing volume pressure is proportionally lower with lower timing volume pressures. Thus, while it requires a longer period of time to reduce lower timing volume pressures a given amount, the given amount itself is actually reduced by the effect of the differential area of piston 105 to offset the non-linearity and accordingly establish a constant timing period. By proper design of the inshot valve details, this variable pressure drop can be established to very closely compensate for the characteristic non-linear pressure time relationship that exists, when exhausting pressures in a given volume to atmosphere. Accordingly, the duration the inshot valve 110-111 remains closed during the second stage of emergency is substantially constant, irrespective of the pressure in the timing volume when an emergency brake application is initiated.

DIRECT RELEASE AFTER SERVICE BRAKE APPLICATION

With the service valve 26 piston stack in lap position following a service brake application, as hereinbefore discussed, a brake pipe pressure increase, due to a pressure fluctuation, will raise piston abutment 34 sufficiently to raise release stability valve member 51 and thereby dissipate the brake pipe pressure fluctuation via stability choke 46 and open valve 52-53, slightly reducing the effective brake pipe pressure and slightly increasing the fluid pressure prevailing in chamber 47 to stabilize the service valve stack and prevent an undesired release of the brake application.

In the event a bona-fide increase of brake pipe pressure occurs incident to a desired release of the brake application, the rate of flow of brake pipe pressure via stability choke 46 will be insufficient to so stabilize the service valve 26 piston stack. Consequently, a pressure increase is developed in chambers 42 and 48, which creates an upward acting force imbalance on the piston stack of service valve 26 sufficient to raise the piston stack to release position and thereby unseat valve element 38 from its seat 40. Pilot pressure in chamber 61 of application and release valve 27 is thus vented to atmosphere via passage 156, valve 38-40, passage 157, and atmospheric chamber 116. This allows piston actuator 60 to be reset to release position by the poppet valve return springs.

Quick service poppet valve 59 is thus forced to its deactuated position in which quick service valve 161-162 is closed and accelerated release valve 161-181 is opened, the latter connecting emergency reservoir pressure previously established in passage 180 with brake pipe via passages 163, 129, and 120. This cause a direct release of the brakes (consistent with A.A.R. requirements for freight brake operation), while also accelerating such brake release by the flow of emergency reservoir pressure into the brake pipe at each car.

At the same time, charging valve 57 is deactuated to open valve 58-59 and thereby connect pressure in brake cylinder chamber 10 to atmosphere via passages 167, 173, 186, an exhaust choke 192 in a passage 193, atmospheric chamber 62 of application and release valve 27, passage 177 and atmospheric chamber 116. In addition, the charging valve 57 re-establishes the charging communication between the brake pipe and emergency reservoir via choke 130, and brake cylinder chamber 13 via choke 139.

Also, release pressure control poppet valve 58 is deactuated to close its valve 147-148 and thereby interrupt the potential connection of pressure between brake cylinder chambers 13 and 14, in parallel with choke 143, thus assuring proper brake release time, by reason of the pressure equalization between chambers 13 and 14 being controlled via choke 143. It will be seen that the reconnection of chambers 13 and 14 via choke 143 is controlled by deactivation of poppet valve 64.

As the pressure in brake cylinder chamber 10 is reduced, the pilot control pressure in transfer valve pilot chamber 68 is concurrently exhausted via transfer pilot valve 29. When the pressure in chamber 10 approaches atmospheric pressure, transfer valve piston actuator 67 is reset by the bias springs of poppet valves 63, 64, 65, and 66, which are concurrently shifted to their deactuated positions.

Poppet valve 63 thus effects closure of valve 135-136 and thereby cuts off further flow of emergency reservoir pressure to the brake pipe and accordingly terminates accelerated release activity.

Poppet valve 64 opens its valve 178-179 to allow pressure equalization to occur between brake cylinder chambers 13 and 14 via charging choke 143, thus destroying the pressure differential across power piston 12, which in conjunction with the force of return spring 18 and the exhaust of pressure from positioning piston 9, effects a release of the braking forces. The size of choke 143 is so selected as to require a predetermined duration, as for example 25 seconds, to obtain complete release of the brakes, in order to control the train slack action.

Poppet valve 65 closes valve 172-176 to disconnect passage 170 from exhaust passage 177 and opens its valve 171-172 to connect brake cylinder chamber 10 and passage 170, but since neither is pressurized, no action takes place.

Finally, poppet valve 66 opens its valve 165-166 to connect the quick service poppet valve 59 to brake cylinder positioning chamber 10 in preparation for initial quick service activity during the next brake application following brake release.

RELEASE AFTER EMERGENCY BRAKE APPLICATION

Following an emergency brake application, the quick action chamber pressure effective under diaphragm piston valve 93 of quick action chamber breather valve 76 blows down at a controlled rate via breather choke 127, charging choke 126, chamber 94, passage 125, valve 85-86 of accelerated application valve 74, and vent passage 183 leading to atmospheric chamber 116. Since breather choke 127 and charging choke 126 are in series, the smaller charging choke limits this flow. In addition, quick action chamber pressure blows down via open valve 96, passage 184, a blowdown choke 184a, open valve 85-86 and vent passage 183. Thus, the parallel chokes 126 and 184a cooperate to control the rate of quick action chamber blowdown as to establish approximately a 60 seconds delay before complete blowdown of the quick action chamber pressure can occur. During this delay period, quick action chamber pressure effective in chamber 79 holds emergency piston 73 in its downwardmost position, in which vent valve pilot valve 75 is held actuated to maintain its valve 91-92 open. Vent valve chamber 32 is accordingly vented, so that if recharge of brake pipe pressure is attempted during this delay period (which is imposed to assure sufficient time to bring a train to a complete stop from an emergency application), the brake pipe pressure will simply blow to atmosphere via open valve 112-114 of vent valve 32, and be ineffective in causing a brake release.

Once the imposed time delay is complete, the vent valve pilot valve 75 is spring returned to its normal position by the action of a return spring 193, thus effecting closure of valve 91-92 and accordingly cutting off the vent valve chamber 113 from atmosphere. This permits the recharge of brake pipe pressure to build up in chamber 113 and effect positive closure of the vent valve. As this recharge of brake pipe pressure reaches approximately 80% of the previous initial brake pipe pressure, the service piston stack 26 moves to release position to effect brake release in the manner outlined during release of a service brake application.

Having now described the invention, what we claim as new and desire to secure by Letters Patent, is:

1. An inshot valve device comprising:
   (a) first valve means having an open and a closed position for conducting and interrupting, respectively, the venting of brake control fluid pressure in response to which venting a brake application is established;
   (b) a control piston having first and second positions in which said control piston is engageable with said first valve means to control operation thereof to said open and closed positions, respectively, said control piston having opposing pressure chambers formed on the respective sides thereof subject to said brake control pressure, said brake control pressure of one of said opposing chambers acting on a first pressure area of said control piston and said brake control pressure of the other of said opposing chambers acting on a second pressure area of said control piston;
   (c) means for biasing said control piston in said first position, in which position said brake control pressure in said one of said opposing chambers is trapped during an emergency brake application, so that said venting of said brake control pressure during said emergency application establishes a pressure differential across said control piston to overcome said bias and force said control piston to said second position; and
   (d) said control piston further having a third pressure area on the same side thereof as said first pressure area, such that said first and third pressure areas combined are a predetermined percentage greater than said second pressure area, said third pressure area being defined by a vented pressure chamber, said control piston further including second valve means operative in said second position of said control piston for connecting said trapped brake control pressure to said vented pressure chamber so as to be effective on said first and third pressure areas of said control piston and thereby prevent said control piston from resetting to said first position for a predetermined duration.

2. An inshot valve device as recited in claim 1, further comprising a timing volume having fluid pressure communication with said one side of said control piston, within said first pressure area thereof.

3. An inshot valve device as recited in claim 1 or 2, further comprising a choke in said vented pressure chamber via which said trapped fluid pressure of said one of said opposing pressure chambers is vented in said second position of said control piston means.

4. An inshot valve device as recited in claim 1, further characterized in that said first and second pressure areas of said control piston are equal.

5. An inshot valve device as recited in claim 4, further characterized in that said predetermined duration is substantially constant irrespective of the level of said brake control pressure at the time of said emergency brake application.

6. An inshot valve device as recited in claim 1, wherein said second valve means comprises:
   (a) said control piston; and
   (b) an annular valve seat with which said control piston is engageable in said first position thereof, whereby said annular valve seat separates said first and third pressure areas, so that upon disengagement of said control piston from said annular valve seat in said second position, said trapped brake control pressure acting on said first pressure area of said control piston is connected to said third pressure area of said control piston.

7. For use with a brake cylinder device having a piston with first and second storage chambers formed on the opposite sides thereof, and with an emergency brake control valve device via which the fluid pressure of said first storage chamber is exhausted in response to an emergency brake command to provide emergency braking force on said piston in accordance with the pressure differential between said first and second storage chambers, an inshot valve device comprising:
   (a) first valve means having an open and a closed position for conducting and interrupting, respectively, said exhaust of fluid pressure from said first storage chamber;
   (b) control piston having first and second positions in which said control piston is engageable with said first valve means to control operation thereof to said open and closed positions, respectively, said control piston having opposing pressure chambers formed on the respective sides thereof subject to said fluid pressure of said first storage chamber;
   (c) means for biasing said control piston in said first position, said emergency brake control valve device being operative during an emergency brake application to trap said first storage chamber fluid pressure in one of said opposing pressure chamber, while said first storage chamber fluid pressure effective in the other of said opposing pressure chambers is exhausted in said open position of said first valve means to thereby establish a pressure differential between said one and said other of said opposing pressure chambers sufficient to overcome said bias and accordingly force said control piston to said second position; and
   (d) said control piston further including second valve means operative in said second position of said control piston for venting said trapped fluid pressure in said one of said opposing chambers so as to cause said control piston to reset to said first position after a predetermined duration.

8. An inshot valve device as recited in claim 7, further characterized by a vented pressure chamber formed on the same side of said control piston as said one of said opposing pressure chambers, said second valve means comprising:
   (a) said control piston; and
   (b) an annular valve seat with which said control piston is engageable in said first position thereof to interrupt fluid pressure communication between said one and said vented pressure chambers, said control piston in said second position being disengaged from said annular valve seat to establish fluid pressure communication between said one and said vented pressure chambers to thereby provide said venting of said trapped fluid pressure in said one pressure chamber.

9. An inshot valve device as recited in claim 8, wherein said one pressure chamber defines a first pressure area of said control piston, said other pressure chamber defines a second pressure area of said control piston, and said vented pressure chamber defines a third pressure area of said control piston, said first and third combined pressure areas exceeding said second pressure area by a predetermined percentage to establish said predetermined duration said resetting of said control piston is delayed.

10. An inshot valve device as recited in claim 8 or 9 further comprising a timing volume having fluid pressure communication with said one of said opposing pressure chambers.

11. An inshot valve device as recited in claim 8, 9, or 10, further comprising a choke via which fluid pressure in said vented pressure chamber is exhausted.

12. An inshot valve device as recited in claim 9, further characterized in that said first and second pressure areas are equal.

* * * * *